Patented June 27, 1939

2,164,255

UNITED STATES PATENT OFFICE 2,164,255

PROCESS OF FERMENTING MOLASSES AND LIKE MASHES

William Ludwell Owen, Baton Rouge, La.

No Drawing. Application April 29, 1935,
Serial No. 18,965

13 Claims. (Cl. 195—13)

In fermenting molasses and like mashes for the production of valuable materials, particularly products such as butanol and acetone, it has been proposed to employ species of bacteria which demand particular prior treatments of the mash. In one type of butanol fermentation, for example, the active organisms are brought to a high state of development by a grain mash, and thereafter the molasses is utilized; but as the molasses constitutes a foreign environment, the action ultimately comes to a standstill, and furthermore the ratio of yield is low.

In the application by Raphael Arroyo, Serial No. 715,374, filed March 13, 1934, now U. S. Letters Patent No. 2,113,471, issued April 5, 1938, it is proposed to employ a particular species of bacteria, known as *B. tetryl*, and found on or at the nodes of sugar cane of a Kassoer variety, in Puerto Rico. This organism is characterized by its inability to ferment sucrose, as it has no inverting power. This organism has the following characteristics:

*Source.*—From roots of the Kassoer variety of cane.

*Name.*—*B. tetryl* (new species).

I. Morphology

1. Vegetative cells motile in early stages, motility becoming less pronounced as the culture becomes older, and finally is lost almost entirely in old cultures. Facultatively anaerobic.

*Media used.*—Molasses of 4-6 Brix density, the sucrose of which is inverted by the addition of sulphuric acid at the rate of 1.5 c. c. conc. acid to 1800 c. c. of mash. It is then neutralized with $CaCO_3$ at rate of 5.5 grams per above volume, and $NH_4OH$ added at rate of 1.5 c. c. Temp. of incubation 35° C. Age 24 hrs. Colonies then established by plating on malt gelatine agar on inverted plates. Acclimatable to densities in excess of 12 Brix.

*Form.*—Rods varying in length, occurring singly and in short and long chains. Peritrichous flagella.

*Size.*—1.5 x 5.6 microns. Ends rounded.

*Stain.*—Stain readily with gentian violet or methylene blue or carbon fuchsine. Gram positive.

2. *Sporangia*—*Media used.*—6 Brix inverted molasses sol. as above described.

*Form.*—Elliptical.

*Spores.*—Polar, and resistant to ordinary methods used for staining vegetative cells. Forms endospores in almost all media: while organism still motile.

II. Cultural features

1. Slightly raised growth on malt gelatine agar slants after 24 hrs. at 35° C.; facultative anaerobe; nonliquefying gelatine.

In malt gelatine agar stabs growth filiform. Surface growth on agar; scanty on agar stroke; dull in luster; smooth surface. Agar colonies circular, diameter undetermined.

2. Good growth on potato plugs at 35° C., produces gas and foam which sometimes rise above the plug.

Good growth in malt agar with calcium carbonate; and in potato dextrose sugar stabs; at first filiform growth, later splitting the agar and becomes spreading with gas formation. Gas from glucose and acid culture; gas from sucrose culture under methods and on medium prescribed by American Bacteriological Society, but apparently only because of presence of sugar inverted by heating during sterilization.

*Little Growth.*—In media without sugars.

*No growth.*—Cohn's solution, Dunham's solution, $NO_3$ peptone solution.

Sugar broth becomes cloudy with formation of a white ppt.

Litmus milk becomes acid with formation of gas and reduction of litmus: curding present but rennet curding absent: peptonization present and positive: indole production negative.

III. Physical and biochemical features

1. *Fermentation tubes.*—Substances fermented with gas evolution.

|  | 12 hrs. | 40 hrs. | 63 hrs. | |
|---|---|---|---|---|
|  |  |  | Gas | Acid |
| Sucrose | 0 | 0 | 0 | 0 |
| Maltose | xx | xxx | x | x |
| Lactose | x | xx | x | x |
| Dextrose | xx | xxx | x | x |
| Levulose | xx | xxxx | x | x |
| Starch | 0 | 0 | 0 | 0 |
| Manitol | x | xx | x | x |

0—Absent.  
x—Present.  
xx—Strong.  
xxx—Very strong.  
xxxx—Strongest.

Further, cultures in mannose, salicin, galactose, inositol, melezitose, glycogen and sorbitol gave negative results at the end of six days; while cultures in l-arabinose, inulin, and fructose gave positive acid (xxx) and gas (xxx) indications in three to four days.

Butanol (butyl alcohol), acetone and a small quantity of ethanol (but no iso-propanol) are produced in the fermentation of the lower sugars (monoses) but the organism is incapable of producing these products from sucrose, or to hydroylze sucrose into invert sugars. The gases formed are carbon dioxide and hydrogen. *B. tetryl* grows in starchy mashes, but does not produce either butanol or acetone to any appreciable degree therein.

*Bacillus tetryl* is found in nature and in the rind of the lower nodes of sugar cane of the Kassoer variety grown in Puerto Rico. Direct cultures in sterile mash of 5 Brix were incubated, and colonies established by plating on malt gelatine agar on inverted plates.

Propagation from the colonies, by the use of sterile molasses mash of successively increasing densities, has shown that the *B. tetryl* is acclimatable to densities in excess of 12 Brix.

I have now found that this organism gives an excellent yield when the molasses is treated with an autolyzed yeast for effecting an inversion of the sucrose therein. This action occurs in cane molasses mashes, especially in those of low purity where the ratio of "non-sugar solids" to "sugar solids" is high, and is particularly the case with beet molasses mashes, as in such cases the sugar present is almost entirely sucrose.

The autolyzed yeast is rich in the inverting enzyme invertase, and also provides cellular substance from the yeast which operates in the accelerating of fermentation by the *B. tetryl*, for example. The autolyzed yeast material also contributes nitrogen and phosphates in a form most suitable for bacterial nutrition, so that it is unnecessary to use inorganic forms of nitrogen or phosphorus which usually are less assimilable than the more natural forms provided in the autolyzed yeast.

Thus, the procedure is effective with various bacteria which are incapable of inverting sucrose or otherwise producing the nutrient lower sugar from which the desired products are formed, or are deficient in their capacities of producing such lower sugars, either of themselves or by means of associated or inherently-generated enzymes or like matters.

By the way of illustration, utilizing the *B. tetryl* aforesaid, by which no inversion is accomplished per se, the operation may be as follows:

Twenty-five gallons of brewery yeast, or the settlings from the storage vats in breweries, consisting largely of yeast cells and beer, is treated with from 250 to 500 cc. of chloroform, or 100 cc. of toluene, and the mixture transferred to a closed container for preventing evaporation of the volatile antiseptic. This suspension of yeast is then kept at a temperature of 50 to 60 degrees C. for two or three days, and the autolysis of the cells is allowed to proceed, until the suspension appears limpid and the yeast settles to the bottom. Inspection of the contents of the container may be made from time to time microscopically; and the degree of liquefaction can be observed by the condition of the cell walls; as a result of the autolysis, the cell walls have an indefinite contour, and the contents of the cells diffuse through the broken-down cell periphery. The liquid resulting from the process of autolysis now contains most of the enzymes originally developed and held in the cell protoplasm, as well as much of the protein and albumen, and the phosphates of the cell juice or cell sap.

The efficiency of the invertase in this autolyzed product is next tested as follows: to 3 liters of a cane molasses mash, of 10 Brix density, are added 4 cc. of tenth-normal sulphuric acid, and after thorough distribution, 50 cc. of the liquid autolyzed yeast. The flask is then stoppered tightly and placed in an incubator at 50 to 60 degrees C. The initial pH should be approximately 4.5 to 5.00. The invertase is allowed to act from eighteen to twenty-four hours. The invert sugar concentration is then tested by the usual method of copper reduction. If the inversion has been complete, the specimen of treated mash is then treated with 4 to 5 grams of calcium carbonate, and a pH determination again made, and the mash is adjusted to 5.7 to 6.0 and sterilized, for example by heating. The sterilized mash is cooled to the temperature of incubation and then seeded with the micro-organisms to be used.

The autolyzed yeast preparation may be preserved by adding a few more ccs. of chloroform or toluene, sealed in a tight container, and kept in a cool place until used.

In utilizing the material on a large scale for inverting cane molasses mash, for example, in large scale fermentation, the mash is first acidified by adding concentrated sulphuric acid at the rate of 1 cc. per hundred gallons of mash; which is of course insufficient for producing an acid inversion of the sucrose present. The acidified mash is then sterilized at 180 to 190 degrees F. for half an hour. The mash is cooled to 50 to 60 degrees C., and liquefied autolyzed yeast is added at the rate of one gallon per hundred gallons of mash. After standing for twelve to eighteen hours, the mash will have been inverted; and calcium carbonate is then added at the rate of one pound per hundred gallons. The pH is tested and adjusted to 5.7 to 6.0, and the mash again sterilized as above. The sterile treated mash is cooled to 32 degrees C. and seated with the organisms which are to be employed for the fermentation.

It has been found that the above procedure permits obtaining the following result:

On the basis of 3 liters of mash of approximately 9.5 Brix, which has been acidified with 4 cc. of tenth-normal sulphuric acid, and sterilized as described above; the use of 50 cc. of autolyzed yeast for the three liters, produced in eighteen hours the following sugar inversion:

|  | Original molasses | Original mash | Inverted mash |
|---|---|---|---|
| Brix | 38.0 | 9.5 | 9.5 |
| Total sugar as invert | 50.4 | 5.40 | 5.40 |
| Invert sugar | 16.00 | 1.6 | 5.4 |

As the invert sugar in the product corresponds to the theoretical total sugar, all of the available original sucrose has been inverted, and the mash is ready for use.

It may be pointed out that, by increasing the time during which the invertase is allowed to act, the density of the mash prior to inversion may be increased to 20 Brix, and a complete inversion can be produced in three days at a temperature of from 50 to 60 degrees C. Thus it is possible to invert the sucrose at a greater density than that employed in mashing, so that there is a considerable saving in the tank and vat capacity, and in the time required.

It has also been found that the process may be carried out by the simultaneous addition of autolyzed yeast and the seed or culture of the micro-organisms to be employed. In this modified procedure, the inversion is effected at a pH of from 5.5 to 6.00; so that the inversion is usually slower than when operating at a lower pH. When the invertase and the culture are added simultaneously, one-half as much acid is utilized as would ordinarily be used before sterilization, the sterilization is effected, and then the pH is adjusted just prior to the addition of invertase and culture. While the inversion of a sucrose is slower than with the first type of procedure, at this pH value, and the usual fermentation requires from 47 to 72 hours for its completion and the pH drops during fermentation, it is found that the inversion proceeds with sufficient rapidity to provide adequate amounts of fermentable invert sugar for the requirements of the micro-organisms. On the basis of a series of tests, it has been found that the rate of fermentation of the invert sugar is substantially parallel to the rate of inversion.

A further great advantage in the employment of autolyzed yeast for inverting the sucrose in mashes which are to be fermented by organisms like B. tetryl, which do not secrete invertase, is that slopping back may be employed; and thus distillery slop may be added to the molasses for recovering the unfermented sugars in the slops. Distillery slops from molasses distilleries have a very high ratio of "non-sugar" to "sugar" solids. Further, the ash is correspondingly high in the "non-sugars." Where the original molasses mash has been inverted with acid, and neutralized by calcium carbonate thereafter, the ash in the finished mash is raised to a point which increases the difficulty of accomplishing fermentation of the sugars, which already was a somewhat difficult proposition.

The average analysis of a distillery slop shows total sugar of 0.7–1.25; ash 2–3%; 9–10 Brix. Thus, the ash content in a molasses mash of 20–22 Brix is substantially the same as that in a slop of 9.5 Brix formed as the residue after distillation from the same molasses. The ratio of ash to sugar, therefore, in distilleries slop is approximately 3.5 to 1, while in ordinary molasses mash, it is approximately 1 to 5.

By using autolyzed yeast instead of acid for inverting the molasses mash, and fermenting for twenty-four hours, it has been found possible to add an equal volume of sterilized and neutralized slop and continue the fermentation. An efficient yield from all sugars inclusive of those contained in the distilleries slop and unfermented by the yeast is then obtained. One procedure for this method of "slopping back" is as follows: the initial inverted and sterilized mash of from 9 to 11 Brix is seeded with an organism such as B. tetryl, and fermented for eighteen to twenty-four hours. The density drops to 7 to 8 Brix. An equivalent volume of sterilized distilleries slop is then added, after its pH has been adjusted by the addition of calcium carbonate. The slop and fermenting mash are then thoroughly mixed and the fermentation is allowed to proceed as before. In this manner, the final sugar content of the mixture can be reduced to as low as 0.3%.

As stated above, the fermentation of invert sugar proceeds at substantially the same rate as the inversion of sucrose, when the autolyzed yeast and seed are added simultaneously and their actions are proceeding concurrently. In many instances, this is of considerable advantage. The organisms are furnished with invert sugar just as rapidly as required, but not greatly in excess of their requirements. Invert sugar and amino-acids are known to form unstable and unfermentable compounds; which affect the proper and desired course of the fermentation. Furthermore, it is found that when the inversion is occurring simultaneously with ferments of the invert sugar, the fermentation itself proceeds actively, as the invert sugar is presented to the fermenting organism in a condition which may be denominated "nascent" and hence more susceptible of immediate and controlled fermentation than when it is present in a more "aged" condition and under different circumstances with respect to equilibria and mass action as is the case with the utilization of a prepared mash.

As indicated above and in the copending applications of Rafael Arroyo, Serial No. 215,374 filed March 13, 1934, now U. S. Letters Patent No. 2,113,471, issued April 5, 1938, and 75,497 filed April 20, 1936, now U. S. Letters Patent No. 2,113,472, issued April 5 1938 the specific organism B. tetryl is not effective upon disaccharides, and therefore is a type of organism which responds to the present treatment by which an inversion is accomplished to provide a monose sugar: the specific example above concerning the inversion of sucrose, a disaccharide, to form invert sugar, which contains the monoses, dextrose and levulose.

It is obvious that the invention is not limited to its practice by the illustrative examples only, but that it may be employed in many ways within the scope of the appended claims.

I claim:

1. The method of fermenting disaccharides by the organism B. tetryl, which consists in effecting autolysis of a material containing ordinary yeast, mixing the autolyzed yeast material with a mash containing a disaccharide which is capable of inversion for forming invert sugar and seeding with the organism, effecting inversion by the action of the yeast material, and effecting the fermenting of invert sugar in the mixture substantially in the nascent state as produced by inversion.

2. The method of fermenting molasses by the organism B. tetryl, which consists in effecting autolysis of a material containing ordinary yeast, mixing the autolyzed yeast material with a molasses mash and seeding with the organism, effecting inversion by the action of the yeast material, and fermenting the mixture so that the fermentation of invert sugar occurs substantially in the nascent state produced by inversion.

3. The method of fermenting molasses by B. tetryl, which consists in treating a molasses mash of 5.5 to 6.00 pH and containing sucrose, by adding invertase and seeding with B. tetryl, which consists in effecting autolysis of a material containing ordinary yeast, mixing the autolyzed yeast material with a molasses mash containing a disaccharide which is capable of inversion for forming invert sugar and seeding with the organism, effecting inversion by the action of the yeast material, and fermenting the mixture by the B. tetryl so that invert sugar is fermented substantially in the nascent state produced by inversion.

4. The method of accomplishing the fermentation of molasses and like materials for the production of butanol and acetone, which consists in effecting autolysis of a material containing ordinary yeast, mixing the autolyzed yeast material with a sterile molasses mash and substantially simultaneously seeding with bacteria capable of effecting the fermentation of invert sugar to butanol and acetone, and simultaneously inverting and fermenting the mixture by the action of said bacteria so that the invert sugar is fermented substantially in the nascent state produced in inversion.

5. The method of fermenting both molasses and distillery slop, by the organism B. tetryl, which consists in effecting autolysis of a material containing ordinary yeast, mixing the autolyzed yeast material with a molasses mash containing a disaccharide which is capable of inversion for forming invert sugar, effecting inversion by the action of the yeast material, seeding with a culture of said organism before inversion is complete, fermenting the mixture by the action of the organism in the presence of the autolyzed yeast material, and adding distillery slop to the mixture during the course of fermentation.

6. The method of fermenting both molasses and distillery slop, by the organism B. tetryl, which consists in effecting autolysis of a material containing ordinary yeast, mixing the autolyzed yeast material with a molasses mash containing a disaccharide which is capable of inversion for forming invert sugar, effecting inversion by the action of the yeast material, seeding with a culture of said organism before inversion is complete and adjusting the mixture to an initial density of 9–11 Brix, fermenting the mixture by the action of the organism in the presence of the autolyzed yeast material for about 18 to 24 hours, and adding distillery slop to the mixture during the course of fermentation.

7. The method of fermenting molasses by B. tetryl, which consists in effecting autolysis of a material containing ordinary yeast, mixing the autolyzed yeast material with a molasses mash of 5.5 to 6.0 pH and containing a disaccharide which is capable of inversion for forming invert sugar, effecting inversion by the action of the autolyzed yeast material, seeding with the organism before inversion is complete, and fermenting the mixture by the action of said organism in the presence of the autolyzed yeast material.

8. The method of accomplishing the fermentation of molasses and like materials for the production of butanol and acetone, which consists in effecting autolysis of a material containing ordinary yeast, thereafter mixing the entire autolyzed yeast material with a sterile molasses mash, effecting inversion of the sucrose in the mash for forming invert sugar by the action of the autolyzed yeast material, seeding with bacteria capable of effecting the fermentation of invert sugar to butanol and acetone, said seeding being accomplished prior to the completion of inversion, and fermenting the mixture by the action of the organism in the presence of the autolyzed yeast material whereby the cell wall matter of the autolyzed yeast provides a substrate ingredient for the organism.

9. The method of fermenting disaccharides by the organism B. tetryl, which consists in adding autolyzed yeast material to a mash containing a disaccharide which is capable of inversion for producing invert sugar, effecting inversion of the disaccharide by the action of the autolyzed yeast material, seeding with a culture of B. tetryl at a time substantially prior to completion of the inversion so that inversion and fermentation will at least in part be concurrent, and fermenting the mixture by the action of the the organism in the presence of the autolyzed yeast material.

10. The method of fermenting a disaccharide, which consists in adding autolyzed yeast material to a mash containing the disaccharide for effecting inversion thereof, seeding with bacteria capable of fermenting invert sugar to form butanol and acetone, said seeding being accomplished prior to the completion of inversion, and fermenting the mixture by the action of the organism in the presence of the autolyzed yeast material so that at least a part of the inversion proceeds concurrently with fermentation.

11. The method of fermenting molasses, which consists in adding material containing invertase in the substantial absence of active yeast to a molasses mash containing sucrose and substantially simultaneously therewith seeding with bacteria capable of effecting fermentation of invert sugar to butanol and acetone, and fermenting the mixture by the action of the organism concurrently with the inversion thereof.

12. The method of fermenting molasses by the organism B. tetryl, which consists in effecting autolysis of a material containing ordinary yeast, thereafter mixing the entire autolyzed yeast material with a molasses mash containing a disaccharide which is capable of inversion for forming invert sugar, substantially simultaneously seeding with B. tetryl, and effecting inversion by the action of the yeast material and fermenting the mixture by the action of the organism at an initial density of 9–11 Brix in the presence of the autolyzed yeast material.

13. The method of fermenting molasses by the organism B. tetryl, which consists in effecting autolysis of a material containing ordinary yeast, thereafter mixing the entire autolyzed yeast material with a molasses mash having an initial density of 9–11 Brix and containing a disaccharide which is capable of inversion for forming invert sugar, and seeding with a culture of said organism before inversion is complete, and fermenting the mixture by the action of the organism in the presence of the autolyzed yeast material concurrently with inversion.

WILLIAM LUDWELL OWEN.